April 25, 1933. A. R. LAMBERT 1,905,473
WHEEL
Original Filed April 22, 1926  2 Sheets-Sheet 1

INVENTOR
Alvan R. Lambert
BY
ATTORNEYS

April 25, 1933.   A. R. LAMBERT   1,905,473
WHEEL
Original Filed April 22, 1926   2 Sheets-Sheet 2
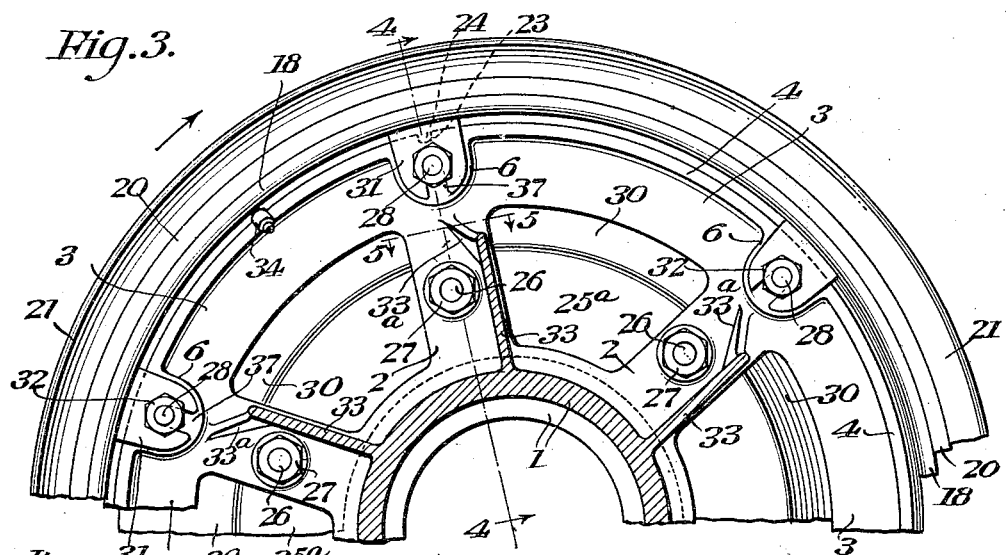
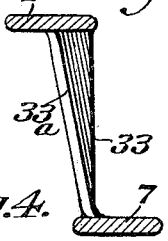
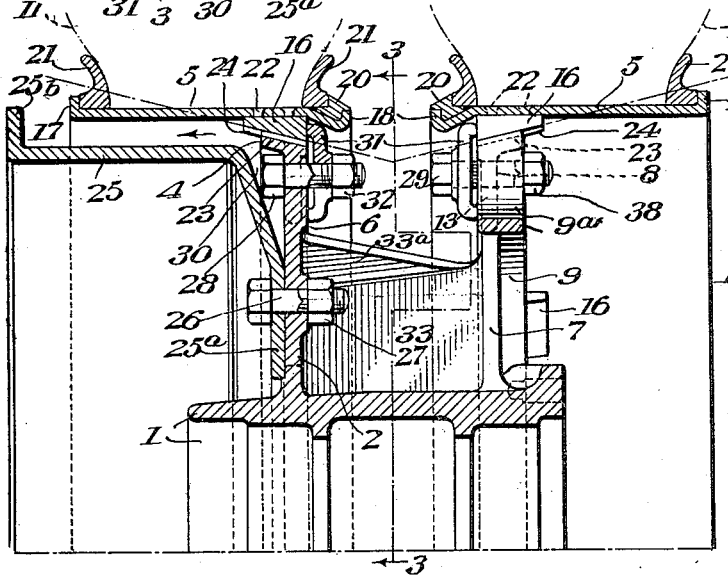
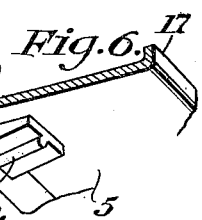
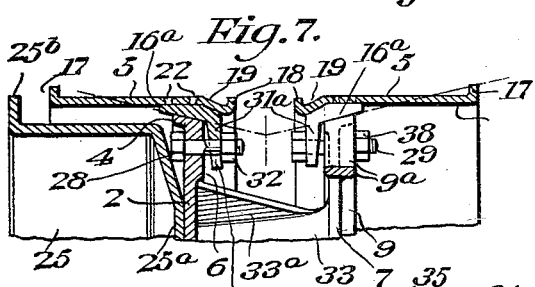
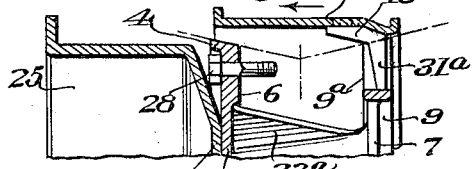
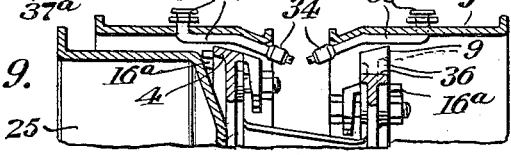
INVENTOR
Alvan R. Lambert
BY
ATTORNEYS Patented Apr. 25, 1933

1,905,473

UNITED STATES PATENT OFFICE

ALVAN R. LAMBERT, OF HOLLYWOOD, CALIFORNIA, ASSIGNOR, BY MESNE ASSIGNMENTS, TO BURNETT WALKER, OF NEW YORK, N. Y.

WHEEL

Application filed April 22, 1926, Serial No. 103,868. Renewed January 22, 1932.

This invention relates to improvements in wheels, and more particularly to pneumatic-tired wheels for automobiles and the like.

The invention has for its objects to provide a self-cooling vehicle wheel; to provide an improved wheel embodying separable body and rim elements; to provide a dual-tire wheel, especially adapted for use on motor busses, motor trucks and other heavy vehicles, which is of light but exceedingly sturdy construction; to provide simple and efficient means whereby a pair of tire-carrying rims may be securely held to the main wheel body in such manner as to permit ready removal thereof when desired; to provide a dual-tire wheel in which two demountable rims of equal diameter and standard form may be employed to carry pneumatic tires without resort to expedients which unduly weaken the main body structure of the wheel; to provide a dual-tire wheel so constructed as to effect air-cooling of the tires and demountable tire-carrying rims when the wheel revolves, and also to effect air cooling of a brake drum when such drum is attached to the wheel; to provide a dual-tire wheel with rim-supporting and holding means so constructed that rims varying widely in width to carry tires of varying sizes may be employed with a standard size of wheel body of minimum width, i. e. having a short hub and rim-supporting means located relatively close together; to provide simple and easily accessible means for locking the rims to the wheel body; to provide simple means for preventing rotary creeping of the rims; to provide a unitary cast metal wheel body and centrifugal fan; and to provide means whereby the movement of the air valve of the pneumatic tire on the inner rim will not be obstructed by the rim-supporting means during assembly and removal of the inner rim, this result being accomplished without weakening the wheel structure.

Figure 1:
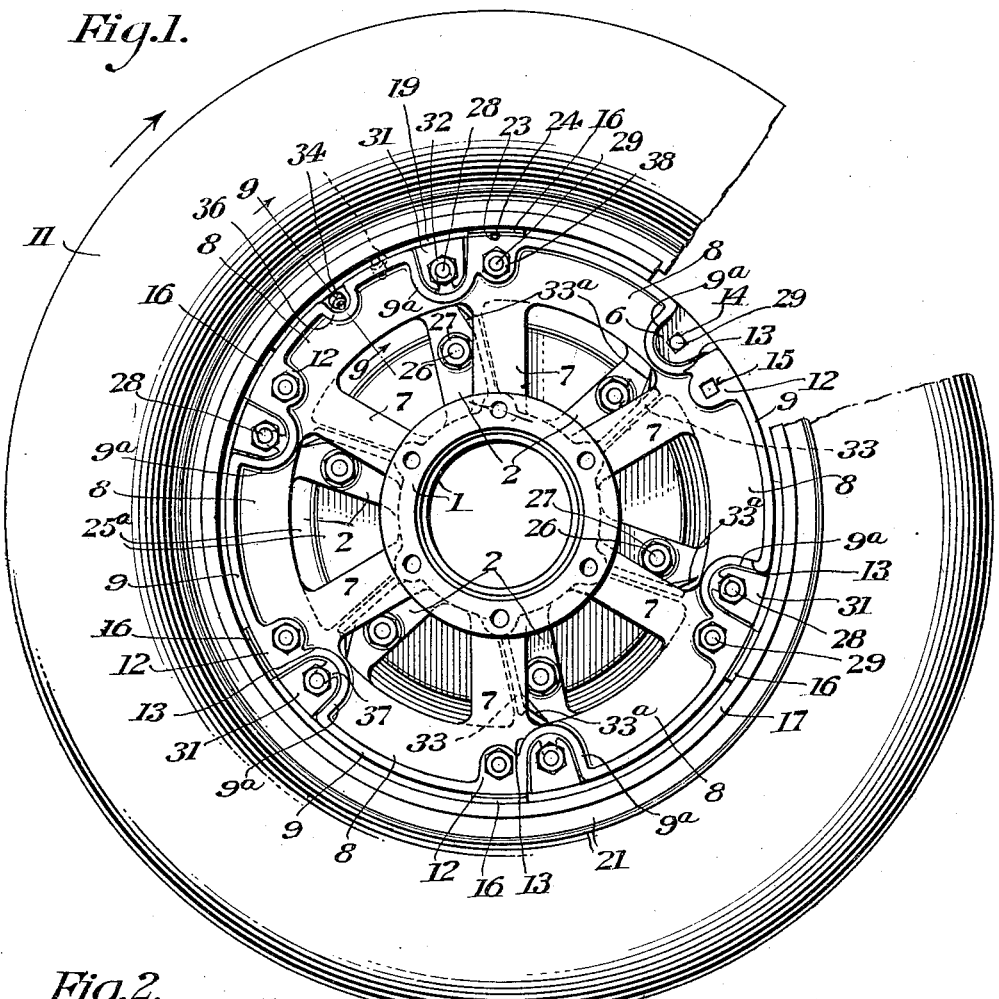
Figure 2:
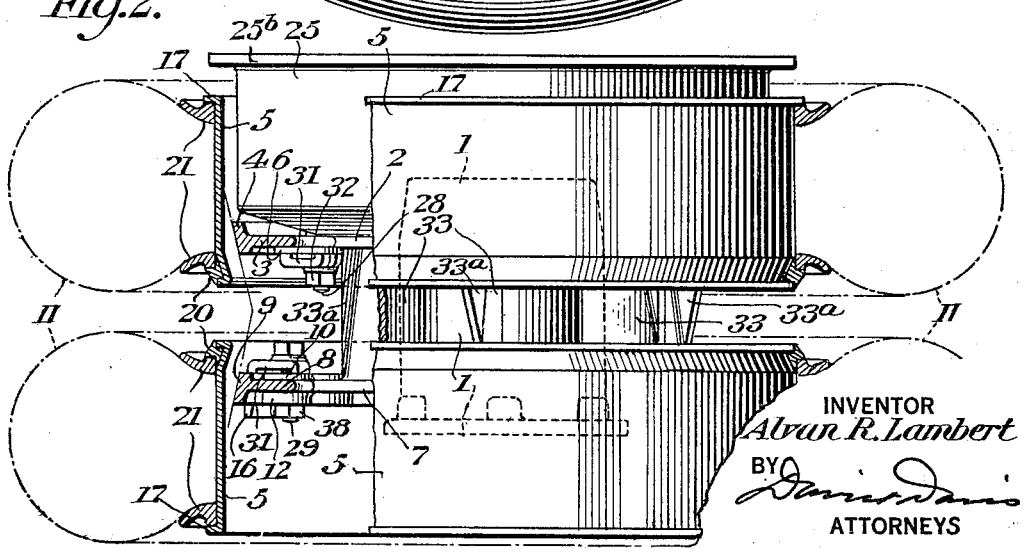

In the drawings, Figure 1 is a side elevation of a dual-tire wheel, as seen from the outer face of the same, illustrating the preferred embodiment of the invention;

Fig. 2 a plan view of the wheel, partly in section;

Fig. 3 a section on the line 3—3 of Fig. 4;
Fig. 4 a section on the line 4—4 of Fig. 3;
Fig. 5 a detail section on the line 5—5 of Fig. 3, showing one of the fan blades;
Fig. 6 a detail perspective view of one of the tire-carrying rims;
Fig. 7 a section similar to Fig. 4, showing a modified form of rim locking means; and
Fig. 8 a view similar to Fig. 7, showing the inner rim being passed by the supporting means for the outer rim; and
Fig. 9 a detail section on the line 9—9 of Fig. 1.

The main body of the wheel, together with the air circulating fan, is preferably formed of cast steel in one piece, as shown. The hub portion 1 is of usual form. Radiating from the hub near its inner end is an inner series of flat spoke members 2 with their broad faces extending transversely of the axis of the hub, said spokes preferably lying in a single vertical plane and being connected by arcuate web portions 3 at their outer ends, said web portions lying in the plane of the spokes 2 and forming, with the outer ends of the spokes, a continuous annular web disposed edgewise in a vertical plane. From the perimeter of the annular web thus formed extends an integral annular flange 4 of frusto-conical form, preferably narrow axially as shown. The flange 4 is adapted to support the inner tire-carrying rim 5 and is arranged with its end of smallest diameter substantially flush with the outer faces of web portions 3 or, more precisely, preferably flush with the faces of bosses 6 projecting slightly outward from the outer faces of spokes 2 at the inner side of the flange.

A second series of spokes 7 radiate from the hub 1 adjacent its outer end, said spokes being of the same form as spokes 2 and preferably staggered relatively to spokes 2 a distance about equal to the width of a spoke. Spokes 7 lie in a single vertical plane and are connected at their outer ends by web portions 8 similar to web portions 3 to form an annular web from the perimeter of which extends an integral and narrow frusto-conical flange 9 generally similar to flange 4 but arranged in reverse relation thereto, i. e. with its smaller end flush with bosses 10 (similar to bosses 6) which project slightly inward from the inner faces of spokes 7 at the inner side of flange 9. Flange 9 is adapted to support the outer tire-carrying rim 5. Bosses 12 project outwardly from the outer faces of spokes 7 directly opposite bosses 10 to points flush with the plane of the outer edge of flange 9; and at one side of bosses 12, directly in register with bosses 6, the web portions 8 are formed with U-shaped notches 13, preferably corresponding in size and outline with bosses 6, and the flange 9 is formed with depressions or U-shaped portions 9ª extending around the edges of notches 13. Bolt holes 14 extend through spokes 2 and the bosses 6 thereon, and bolt holes 15 extend through spokes 7 and the bosses 10 and 12 thereon.

The frusto-conical rim supporting flanges 4 and 9 are of exactly the same size and the demountable tire-carrying rims 5 are of exactly the same size and construction and may be mounted interchangeably on either supporting flange. It will be observed, however, that the rim supporting means are arranged in reverse relation and that the rims are supported thereon in reverse relation with respect to each other, for purposes hereinafter pointed out. Except for the supporting, spacing and retaining wedges 16 secured to their inner faces, the rims are of well-known standard construction, comprising the main annular sheet steel body portion with edge flanges 17 and 18, a depressed channel portion 19 receiving the usual locking ring 20, and the two rings 21 engaging with the shoe of the tire 11 and co-operating with flanges 17 and 18 and ring 20 to hold the tire to the rim. Tires 11 are an ordinary form of pneumatic tire well known in the automobile art. The maximum diameter of the larger ends of flanges 4 and 9 is slightly less than the internal diameter of the depressed portion 19 of the tire-carrying rims.

Each tire rim is provided with a number of the wedges 16 equal to the number of bosses 6 or 12, which number in the construction shown corresponds with the number of spokes supporting each rim-carrying flange. These wedges are rigidly secured to the rims, preferably by providing each wedge with a pair of studs 22 passed up into countersunk holes in the rim and hammered down flush with the outer face of the rim. It will be obvious that these steel wedges 16 might be welded to the rim if desired. The inner faces of the wedges are curved slightly transversely to conform with the arc of the section of the outer surface of either of the flanges 4 and 9 engaged thereby, and taper transversely of the rim, being held to the rim with their thicker ends at the junction of the depressed channel portion 19 of the rim with the main annular body portion of the rim. Each rim-supporting flange is provided with a transverse groove 23 at one point in its periphery, extending entirely thereacross, and one wedge on each rim is provided with a driving rib 24 on its inner face extending transversely of the rim and adapted to engage in groove 23 of the flange about which the rim is slipped to lock the rim against rotation or creeping relatively to the wheel body.

I have shown a steel brake drum 25 having its annular braking portion of less diameter than the larger end of the adjacent conoidal rim-supporting flange 4 and provided at its outer end with an outwardly dished attaching flange encircling the inner end of hub 1 and detachably secured by bolts 26 and nuts 27 against the inner faces of spokes 2. Bolts 26 pass through spokes 2 about midway between hub 1 and web 3 and the dished flange or head 25ª of the drum 25 recedes inward from the spokes 2 and web 3 from a circular line passing around the wheel just beyond the bolts 26 and closer to the hub than the inner edge of web 3 to provide clearance for the heads of a series of bolts 28 passed through bolt holes 14 which, as above described, extend through the outer ends of spokes 2 upon which bosses 6 are formed. This formation and arrangement of the drum head with relation to the wheel body forms an air passage or space 30 in open communication with the space between the two series of spokes 2 and 7 and in open communication with the space between the main braking portion of drum 25 and the surrounding tire-carrying rim 5. At its inner end drum 25 is provided with the usual upturned flange 25ᵇ preferably located at a point sufficiently beyond spokes 2 to lie beyond the plane of the inner edge of rims 5 of the maximum width now used.

In the form of wheel illustrated in Figs. 1 to 6, inclusive, and above particularly described, the two rims 5 with the tires 11 thereon are assembled on and secured to the wheel body casting in the manner which will be now described. The rim and tire to be located at the inner part of the wheel is passed around the outer flange 9, with its flanged edge 17 innermost, by presenting wedges 16 (which are of a size and shape to pass through depressions 9ª in said flange 9) opposite depressions 9ª and then pushing the rim straight in axially of the wheel with that one of the wedges 16 formed with the anti-creeping rib 24 in such position that said rib registers with groove 23 in flange 4. As this rim passes over flange 4 the wedges 16 thereon ride upon the conoidal surface of flange 4 until they all closely hug said flange, and rib 24 is firmly seated in groove 23. The formation of the rim and wedges arrests inward movement of the rim with the outer edge of the rim in predetermined relation with spokes 2, which relation is constant irrespective of the width of rim used, since wedges 16 are located the same distance from the depressed edge 18—19 of rims of all sizes. The overhang of the rim at the inner edge of flange 4 varies, of course, in accordance with the width of the rim. To restrain outward movement of the inner rim metal cramp blocks 31, provided with suitable bolt slots 37, are slipped on the bolts 28 at the outer faces of spokes 2 and are forced tightly against bosses 6 and the outer ends of wedges 16 on the inner rim, and are locked in place by means of nuts 32. The outer edges of blocks 31 are broad and slightly curved to lie close enough under the rim 5 to prevent turning of the blocks on bolts 28. It will be observed from Fig. 1 that nuts 32 on the bolts 28 passed through spokes 2 may be screwed on or off by inserting a wrench through depressed portions 9ª of flange 9, and that the openings between spokes 7 permit insertion of the hands or tools into the space between the spokes for manipulating nuts 27 or blocks 31 as well as nuts 32 if desired. Access to nuts 32 and blocks 31 may also be had through the space between the flanges 4 and 9, as may be most convenient.

After the inner rim with its tire is locked on the flange 4, the outer rim with its tire is assembled on the wheel body casting by presenting the depressed edge portion 18—19 of the rim next to flange 9 with wedges 16 opposite the depressions 9ª and that one of the wedges which is formed with rib 24 opposite the depression which is adjacent the groove 23 in flange 9. This rim is then slipped inward over flange 9 sufficiently far to permit rotation of the rim about flange 9, without obstruction by wedges 16 and rib 24 (the spacing of the two series of spokes from each other being sufficient for this purpose), until rib 24 registers with groove 23 in flange 9, whereupon the rim is drawn outward to seat the rib in the groove and cause the wedges to closely grip the flange. The arrangement of flange 9 and the wedges engaged therewith is such as to now hold the outer rim against outward movement with the inner edge of the outer rim in predetermined relation with spokes 7 and the outer edge of the inner rim, which relation will be constant irrespective of the width of the outer rim. To lock the outer rim against inward movement bolts 29 are passed outward through the bolt holes 15 which extend through spokes 7 and the bosses 12 and 10 thereon, the cramping blocks 31 being placed on said bolts 29 adjacent the heads thereof and being drawn tightly against bosses 10 and the inner ends of wedges 16 on the outer rim by means of the nuts 38 which, in the present case, are screwed up against bosses 12 on the outer faces of spokes 7. Access to the outer series of bolts 29 and blocks 31 is afforded by the openings between spokes 7. It will be obvious that the rims with the tires thereon may be readily removed by reversing the operations above described.

It is well known that brake drums of motor vehicles become undesirably heated in use, and also that the tires and rims become so highly heated as to result in injury to or destruction of the tires. To avoid damage resulting from such heating I have provided a wheel so constructed that these parts will be air-cooled during operation of a vehicle equipped with the improved wheel. As heretofore stated the annular air space between the drum 25 and inner rim 5 communicates at the inner edge of said inner rim with the atmosphere and is connected by the air passage 30 and the spaces between spokes 2 with the air space between the two series of spokes 2 and 7. A series of substantially radially arranged webs or impeller blades 33 are cast integrally with the wheel body. The main body portions of these blades are flat, being joined along one edge with spokes 2 along the leading edges of said spokes, and along their opposite edge with spokes 7 well back of the leading edges of the latter spokes (see Figs. 1, 3 and 5), and extending outward from hub 1 to points within the circular line of webs 3 and 8. The uper portion of each blade is turned back counter-clockwise as shown at 33ª, the line of bend extending preferably downward and inward from the outer upper corner of the main flat body of the blade, as shown, and the upper edge of blade portion 33ª preferably rising from said corner to its junction with spoke 2, as more clearly shown in Figs. 3 and 4, to a point about in the line of curvature of the inner edge of web 3. The head 25ª of drum 25 partly closes the inner end of the centrifugal fan formed by the wheel body casting. The wedges 16 support both tire-carrying rims on their supporting flanges 4 and 9 at circumferentially spaced points leaving air passages between each rim and its supporting flange in the intervals between the wedges. The spaces between spokes 7 afford axial intake openings for the fan. When the wheel revolves, air enters in advance of the leading edge of each spoke 7 and is thrown axially inward and generally radially outward relatively to the wheel by the spoke 7 and its connected blade 33—33ª, so that some of the air passes between the two adjacent spokes 2 over the drum head 25ª through the passage 30 heretofore referred to, into the air space between the main annular body of the brake drum 25 and the inner rim. Some of the air thus thrown passes out between the two tires 11 and serves to cool the adjacent sides of the tires. Still other portions of the air blast pass inward through the air spaces between the inner rim 5 and the flange 4 above referred to and merge with the air passing inward through passage 30, these two air currents serving to cool the drum 25 and the entire inner surface of the inner rim 5, and finally are directed radially of the wheel by drum flange 25ᵇ around the adjacent side of the inner tire 11. The described air blast set up by the fan draws air into the space between the two series of spokes 2 and 7 through the openings between spokes 7, and also creates an induced draft through the air spaces between flange 9 and outer tire-carrying rim 5 in the intervals between wedges 16, as well as through depressions 9ª in flange 9. These induced drafts pull air in around the outer side of the outer tire and over the entire inner surface of the rim 5 carrying said tire. It thus will be seen that both tires and both rims, and also the brake drum, are subjected to the cooling effect of air currents so as to effectually prevent undue heating thereof.

To afford clearance for the usual air valve 34 and the usual air-valve-carrying tube 35 for each tire 11 in assembling and removing the rims, flange 9 is provided with a depression 36 generally similar to the depressions 9ª in flange 9. It will be observed that flanges 4 and 9 are continuous and unbroken and are not slotted transversely at any point even through a part of the width thereof, so that very strong rim supports are afforded.

The bolt holes for bolts 26, 28 and 29 are preferably made square and the unthreaded shank portions of the bolts which engage in said holes are of similar form in cross-section, as shown.

The modified form of wheel shown in Figs. 7 and 8 is constructed exactly as the wheel illustrated in Figs. 1 to 6, except that the grooves 23 in flanges 4 and 9 are omitted, the wedge rib 24 is omitted, and instead of providing the independent cramping blocks 31 I provide integral cramping blocks or lugs 31ª which extend radially inward from the thicker ends of the rim wedges 16ª which correspond with the wedges 16 of the form of wheel shown in Figs. 1 to 6 and are secured in the same manner and in the same positions on the rims 5. The lugs 31ª and wedges 16ª are adapted to be passed through depressions 9ª in flange 9 in assembling the rims 5, the wedges on which are engaged with the flanges 4 and 9, by manipulating the rims in the manner heretofore described. Since the bolts 28 and 29 pass through the bolt slots 37ª in lugs or cramping members 31ª which, in the present case, are formed integrally with the wedges, it will be obvious that there is no need of a locking rib and groove to prevent relative rotation between a tire-carrying rim and its supporting flange in this modified form of wheel.

While I have illustrated two forms of dual-tire wheels, it will be obviouis that my invention is not limited in its application to the two structures shown, and further that certain features of the invention may be used in connection with wheels having a single tire.

It also will be obvious that by providing the two continuous flange and web structures 4—3 and 9—8 around the outer ends of the two series of spokes I not only produce a very strong wheel body, but also provide a form of rim support readily adaptable for use in wheels wherein it is desired to employ a number of rim-supporting wedges and retaining devices differing from the number of spokes, as the desired number of retaining bolts may be located at any points along the webs 3 and 8, and the desired number of depressions 9ª may be formed in flange 9 at any points around the flange, instead of in the manner shown wherein each rim is supported at points in radial alignment with the adjacent series of spokes.

What I claim is:

1. A dual wheel structure comprising a hub, spaced fellies adapted to support demountable rims, a spaced series of spokes connecting each felly to the hub, each series being located substantially in the plane of its felly, and fan blades arranged substantially radially and connecting axially adjacent spokes of the two series, the blades extending from the hub outward and providing air circulation inward between certain spokes and outward between the fellies and rims and tires mounted thereon, the fan blades having outer end portions bent rearwardly from the leading surface of the blades.

2. A wheel structure comprising a hub having inner and outer ends, a first series of spokes extending from the inner end of the hub, a second series of spokes extending from the outer end of the hub, fan blades extending from spokes of the first series to spokes of the second series, said fan blades being arranged radially in planes extending longitudinally of the hub, the fan blades having their outer ends bent rearwardly from the leading surface of the blades.

3. A wheel structure comprising a hub having inner and outer ends, a first series of spokes extending from the inner end of the hub, a second series of spokes extending from the outer end of the hub, fan blades extending from spokes of the first series to spokes of the second series, said fan blades being arranged radially in planes extending longitudinally of the hub, each fan blade having its outer end formed with a projection extending radially outwardly, axially inwardly, and rearwardly from its radially and axially outer corner.

In testimony whereof I hereunto affix my signature.

ALVAN R. LAMBERT.